US008085982B1

(12) United States Patent
Kim et al.

(10) Patent No.: US 8,085,982 B1
(45) Date of Patent: Dec. 27, 2011

(54) OBJECT TRACKING IN VIDEO WITH VISUAL CONSTRAINTS

(75) Inventors: Minyoung Kim, Piscataway, NJ (US); Sanjiv Kumar, Brooklyn, NY (US); Henry A. Rowley, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 859 days.

(21) Appl. No.: 12/143,590

(22) Filed: Jun. 20, 2008

(51) Int. Cl.
*G06K 9/00* (2006.01)
*G06K 9/46* (2006.01)
*G06K 9/66* (2006.01)

(52) U.S. Cl. ........ 382/103; 382/118; 382/195; 382/100; 382/115

(58) Field of Classification Search .................. 382/100, 382/103, 115–118, 195
See application file for complete search history.

(56) References Cited

U.S. PATENT DOCUMENTS

| | | | | |
|---|---|---|---|---|
| 7,454,039 | B2 * | 11/2008 | Tu et al. | 382/115 |
| 7,522,772 | B2 * | 4/2009 | Porter et al. | 382/218 |
| 2005/0129277 | A1 * | 6/2005 | Porter et al. | 382/103 |
| 2009/0238404 | A1 * | 9/2009 | Orderud et al. | 382/103 |
| 2011/0243381 | A1 * | 10/2011 | Tsagkatakis et al. | 382/103 |

OTHER PUBLICATIONS

Kruger et al., "Efficient Head Pose Estimation with Gabor Wavelet Networks," In Proc. British Machine Vision Conference, Bristol, UK, Sep. 12-14, 2000.*
Arandjelovic et al., "Face recognition from video using the generic shape-illumination manifold", 2006. ECCV. 15 pages.
Avidan, "Support vector tracking", 2001. CVPR. 8 pages.
Berrani et al., "Enhancing face recognition from video sequences using robust statistics", 2005. Advanced Video and Signal Based Surveillance (AVSS). 7 pages.
Black et al., "EigenTracking: Robust matching and tracking of articulated objects using a view-based representation", 1996. ECCV. 16 pages.
Chellappa, et al., "Probabilistic recognition of human faces from video", 2002. ICIP. 6 pages.
Comaniciu, et al., "Kernel-based object tracking". *IEEE Trans. on PAMI*, 25(5):564-575, 2003. 14 pages.
Gorodnichy, "Associative neural networks as means for low resolution video-based recognition", 2005. International Joint Conference on Neural Networks (IJCNN). 7 pages.
Hager, et al., "Multiple kernel tracking with SSD", 2004. CVPR. 12 pages.
Isard, et al., "Contour tracking by stochastic propagation of conditional density", 1996. ECCV. 16 pages.

(Continued)

*Primary Examiner* — Andrew W Johns
*Assistant Examiner* — Shefali Goradia
(74) *Attorney, Agent, or Firm* — Sterne, Kessler, Goldstein & Fox PLLC

(57) ABSTRACT

Embodiments of the present invention relate to object tracking in video. In an embodiment, a computer-implemented method tracks an object in a frame of a video. An adaptive term value is determined based on an adaptive model and at least a portion of the frame. A pose constraint value is determined based on a pose model and at least a portion the frame. An alignment confidence score is determined based on an alignment model and at least a portion the frame. Based on the adaptive term value, the pose constraint value, and the alignment confidence score, an energy value is determined. Based on the energy value, a resultant tracking state is determined. The resultant tracking state defines a likely position of the object in the frame given the object's likely position in a set of previous frames in the video.

24 Claims, 6 Drawing Sheets

OTHER PUBLICATIONS

Jepson, et al., "Robust online appearance models for visual tracking". *IEEE Trans. on PAMI*, 25(10):1296-1311, 2001. 16 pages.

La Cascia, et al., "Fast, reliable head tracking under varying illumination: An approach based on registration of texture-mapped 3D models". *IEEE Trans. on PAMI*, 22(4):322-336, 2000. 17 pages.

Lee, et al., "Visual tracking and recognition using probabilistic appearance manifolds". *Computer Vision and Image Understanding*, 2005. 36 pages.

Lee, et al., "Video-based face recognition using probabilistic appearance manifolds", 2003. CVPR. 9 pages.

Li, et al., "Tracking in low frame rate video: A cascade particle filter with discriminative observers of different lifespans", 2007. CVPR. 8 pages.

Li, et al., "Video-based online face recognition using identity surfaces", 2001. ICCV Workshop on Recognition, Analysis, and Tracking of Faces and Gestures in Real-Time Systems. 9 pages.

Liu, et al., "Spatio-temporal embedding for statistical face recognition from video", 2006. ECCV. 16 pages.

Liu et al., "Video-based face recognition using adaptive hidden Markov models", 2003. CVPR. 7 pages.

Ross, et al., "Incremental learning for robust visual tracking". *IJCV*, 2007. 20 pages.

Stallkamp et al., "Video-based face recognition on real-world data", 2007. ICCV. 8 pages.

Zhang, et al., "Graph based discriminative learning for robust and efficient object tracking", 2007. ICCV. 8 pages.

\* cited by examiner

OBJECT TRACKING IN VIDEO WITH VISUAL CONSTRAINTS

BACKGROUND

1. Field of the Invention

This invention relates to object tracking in video.

2. Related Art

Web video services, such as the YouTube™ service provided by Google Inc. of Mountain View, Calif., have greatly increased the amount of available digital video. It is often desirable to track an object, such as a human face, across a sequence of frames in a video. However, object tracking can be challenging due to occlusions and variations in an illumination, position and appearance of the object.

Once an object is tracked in the video, an object recognition algorithm may be used to identify the object. In an example, a face recognition algorithm can use the position of the face in each frame to determine the face's identity. Numerous approaches to face tracking and recognition have been proposed.

One approach to object tracking, called Eigentracking, is described in Black et al., "Eigentracking: Robust Matching and Tracking of Articulated Objects Using a View-Based Representation," 1996, *ECCV*. Eigentracking uses a predefined model of an object, such as a face, being tracked. The model encompasses a range of variations of the object being tracked. For example, when a face is being tracked, the model may be trained with different images of the face. This approach has two main setbacks. First, the model may not encompass all the possible variations of the object, e.g. the model may not include all the possible ways the face may be displayed in the video. Second, Eigentracking often fails when the object being tracked is occluded as those variations are not included.

In contrast to Eigentracking, incremental visual tracking (IVT) can track an object, such as a face, without a predefined model. IVT is described in Ross et al., "Incremental Learning for Robust Visual Tracking," 2007, *IJCV*. NT starts with an initial location of an object, such as a face, and builds its model as the object is tracked across more frames. While IVT avoids Eigentracking's problem of an incomplete predefined model, IVT also suffers from a setback. As IVT tracks an object, alignment errors may arise. The alignment errors may compound as more frames are processed. As alignment errors compound, IVT may drift from the tracked object.

Once a face is tracked, the position of the face in each frame can be used by a face recognition algorithm to determine an identity. One approach to face recognition is described in Lui and Chen, "Video-based Face Recognition Using Adaptive Hidden Markov Models", 2001, *CVPR*. While this approach has advantages, it may have accuracy problems.

Systems and methods are needed that accurately track and recognize faces in video.

BRIEF SUMMARY

Embodiments of the present invention relate to object tracking in video. In an embodiment, a computer-implemented method tracks an object in a frame of a video. An adaptive term value is determined based on an adaptive model and at least a portion of the frame. A pose constraint value is determined based on a pose model and at least a portion the frame. An alignment confidence score is determined based on an alignment model and at least a portion the frame. Based on the adaptive term value, the pose constraint value, and the alignment confidence score, an energy value is determined. Based on the energy value, a resultant tracking state is determined. The resultant tracking state defines a likely position of the object in the frame given the object's likely position in a set of previous frames in the video. The adaptive model is determined based on at least one previous frame of the video. The pose model is determined based on different possible appearances of the object. The alignment model detects misalignments of the tracked object.

In another embodiment, a system tracks an object in a frame of a video. The system includes a pose constraint module that determines a pose constraint value based on a pose model and at least a portion the frame. An alignment constraint module that determines an alignment confidence score based on an alignment model and at least a portion the frame. An adaptive module determines an adaptive term value based on an adaptive model and at least a portion of a frame in the video. A visual constrainer determines an energy value based on the adaptive term value, the pose constraint value, and the alignment confidence score. A tracker determines a resultant tracking state based on the energy value. The resultant tracking state defines a likely position of the object in the frame given the object's likely position in a set of previous frames in the video. The adaptive model is determined based on at least one previous frame of the video. The pose model is determined based on different possible appearances of the object. The alignment model detects misalignments of the tracked object.

By using visual constraints, embodiments of the present invention accurately track faces in video.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 3:
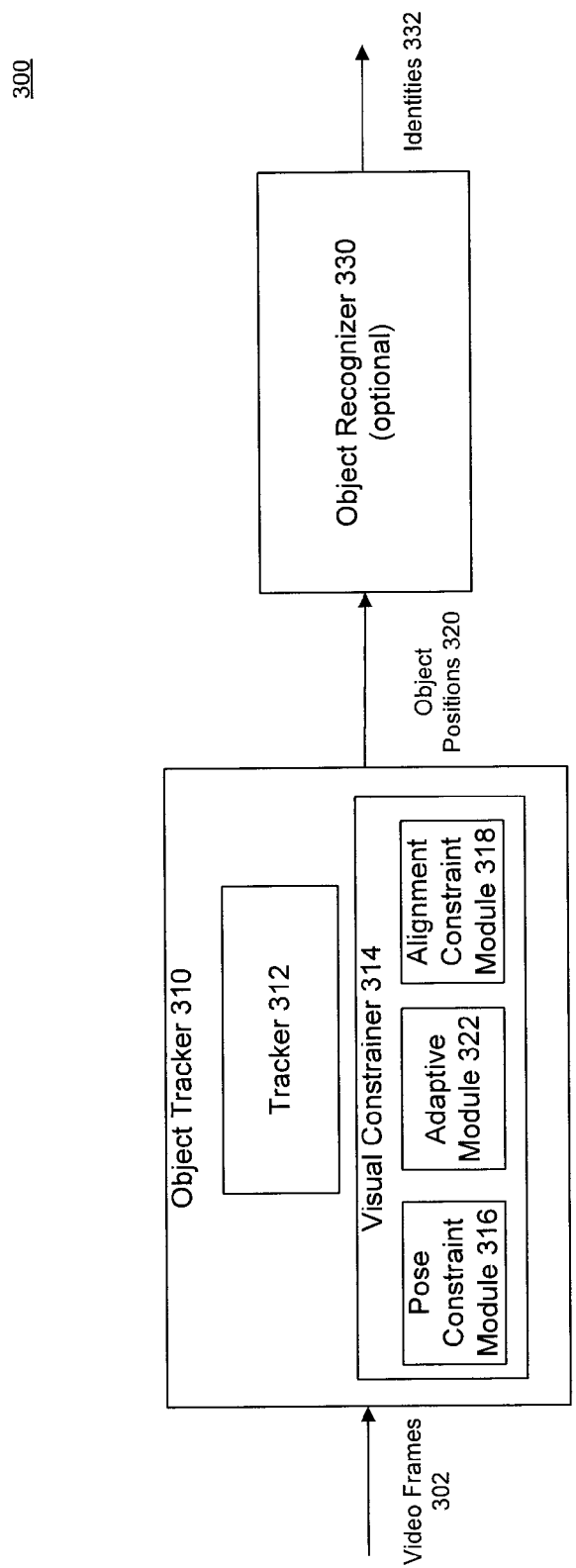
FIG. 3 is an architecture diagram illustrating a system for object tracking and recognition according to an embodiment.
Figure 6A:
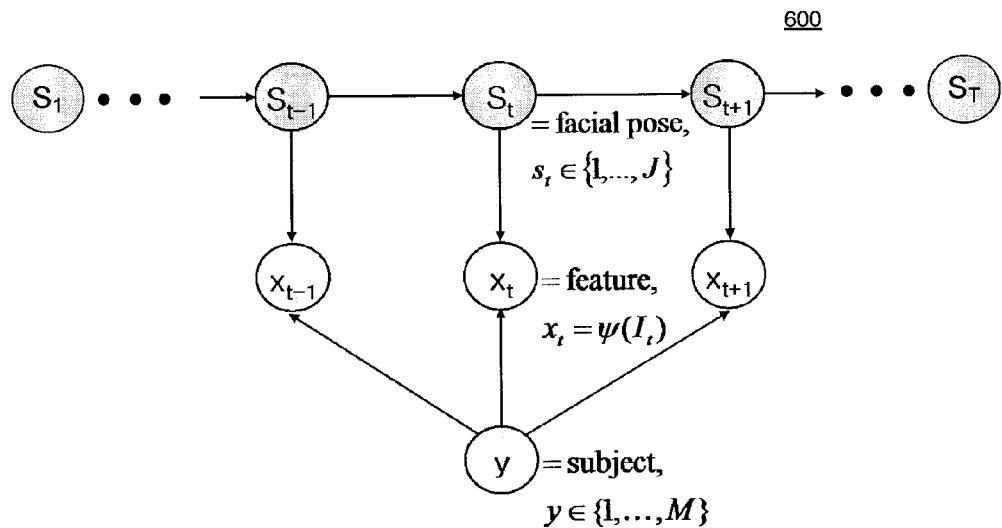
Figure 6B:
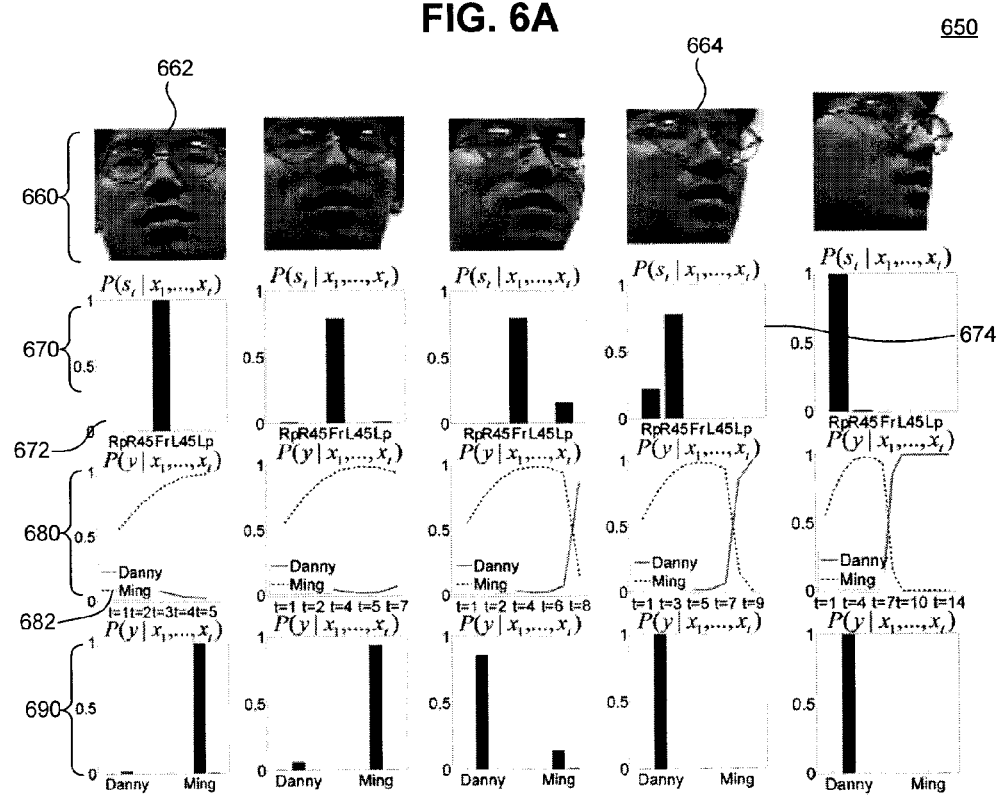

FIGS. 6A-B show diagrams illustrating an exemplary method of face recognition, which may be used by the system in FIG. 3.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments of the present invention track objects, such as faces, in video using visual constraints. Once the face is tracked, some embodiments employ face recognition to identify the face. In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
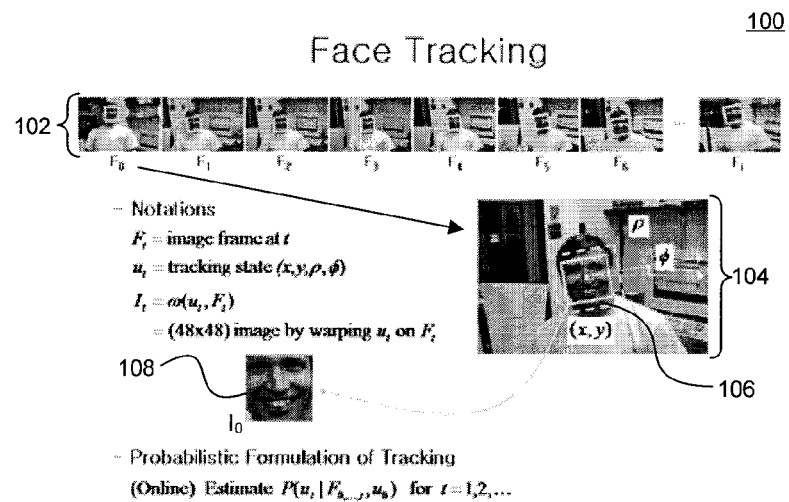
FIG. 1 is a diagram illustrating face tracking in a video.

FIG. 1 shows a diagram 100 illustrating a video with a face being tracked. Although diagram 100 illustrates face tracking, it would be understood to those of skill in the art that other objects could be tracked as well. Diagram 100 illustrates a possible probabilistic formation of face tracking in an embodiment. Diagram 100 shows a video 102 that includes a sequence of frames $F_0$ through $F_t$. Each frame $F_t$ is a frame of the video at a time t. Video 102 shows a human face at different positions. In an embodiment, a user may input a position of the face in an initial frame $F_0$. In another embodiment, a face detector may automatically determine the position of the face in initial frame $F_0$. An example face detector is described in Li et al., "Tracking in Low Frame Rate Video: A Cascade Particle Filter with Discriminative Observers of Different Lifespans", 2007, *CVPR*. The position of the face in frame $F_0$ is defined by an initial tracking state $u_0$.

Once initial tracking state $u_0$ is determined, a face tracking model based on the appearance of the face can be built. In an embodiment, the portion of initial frame $F_0$ defined by tracking state $u_0$ is cropped and warped. The tracking state $u_0$ may define an angle of the face and a size of the face. The initial frame $F_0$ may be cropped and warped to normalize the size and angle of the face. The warping function may be defined by, in one example, $I_t = \omega(u_t, F_t)$. The warping function applied to initial tracking state $u_0$ and frame $F_0$ results in an initial cropped image $I_0$ with a standard size and orientation. In an example, the standard size may be 48 pixels by 48 pixels. Diagram 100 illustrates the warping function showing a portion 106 of an image 104 being warped into a cropped image 108.

Using initial cropped image $I_0$, embodiments begin to learn the appearance of the face. Using the learned appearance of the face and additional visual constraints, the positions of the face in frames $F_1$ through $F_t$ are determined sequentially. The positions of the face in frames $F_1$ through $F_t$ may be defined by tracking states $u_1$ through $u_t$. Each tracking state $u_1$ through $u_t$ may include a set of four variables x, y, ρ and φ defining a portion of a frame $F_t$. Variables x, y may define a coordinate of a center of the face in frame $F_t$. Variable ρ corresponds to the size of the face in frame $F_t$. Variable φ is an angle of the face from a horizontal axis of frame $F_t$. Each tracking state $u_1$ through $u_t$ also may include an estimated pose of the object (such as a face) being tracked.

In an embodiment, the probability that a particular tracking state $u_t$ includes the face may be modeled as:

$$P(u_t | F_{0\ldots t}), \text{ for } t=1, 2, \ldots. \quad (1)$$

A resultant tracking state that includes the face may be determined by determining the tracking state $u_t$ having a highest probability $P(u_t | F_{0\ldots t})$. In embodiments, the resultant tracking state may be determined using particle filtering, gradient descent, mean-shift or other means known to those of skill in the art.

As more tracking states are determined, more images are incorporated into the model of the appearance of the face. However, when this appearance model is taken alone, small errors in the tracking states may tend to compound. The compounding errors may result in the determined tracking states drifting away from the actual position of the face in the video. Embodiments of the present invention impose additional visual constraints that help prevent drift.

Figure 2A:
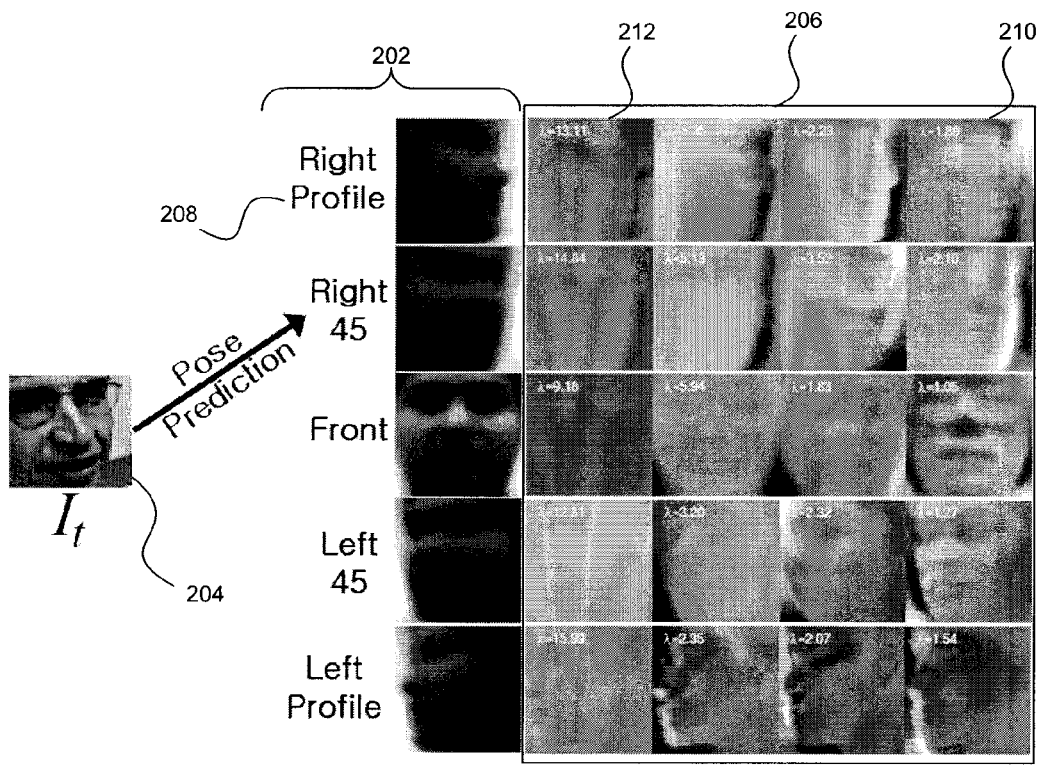
FIG. 2A is a diagram illustrating a pose constraint according to an embodiment.
Figure 2B:
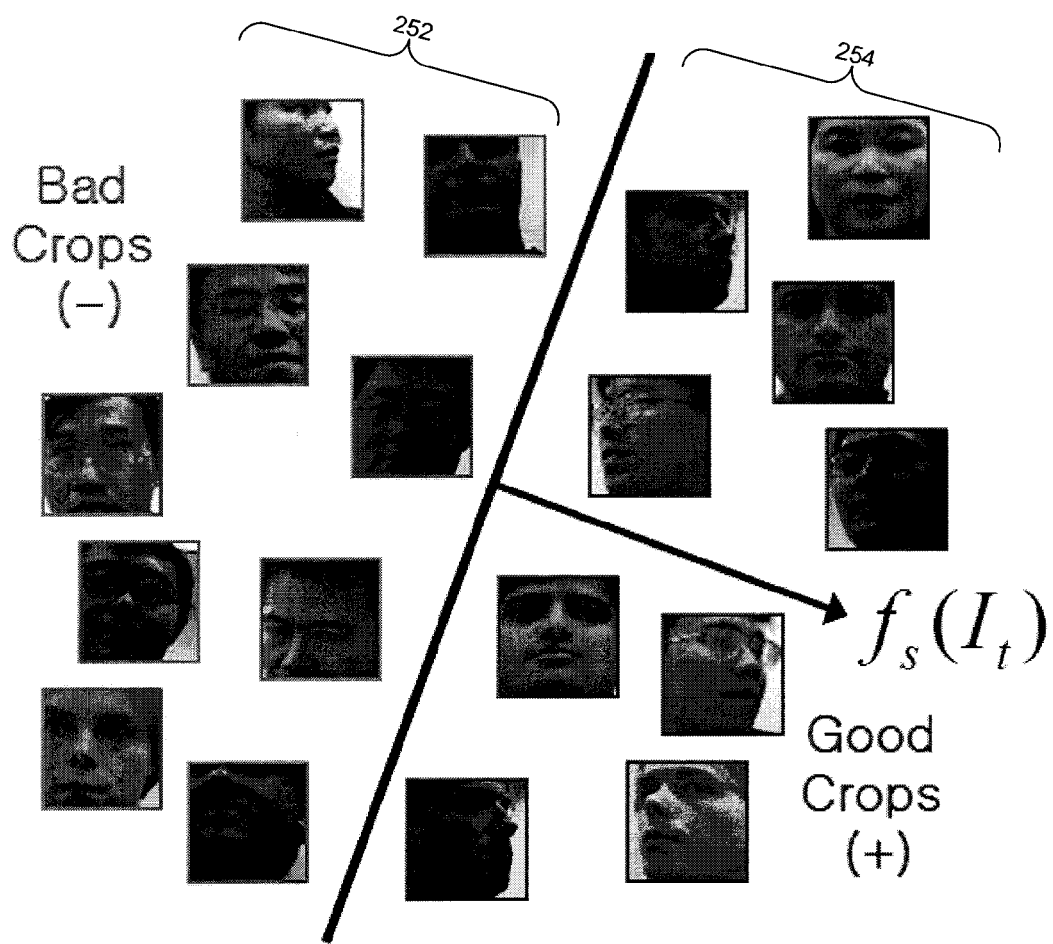
FIG. 2B is a diagram illustrating an alignment constraint according to an embodiment.

FIGS. 2A-B illustrate two visual constraints—a pose constraint and an alignment constraint—according to embodiments of the present invention. Both constraints have an associated model as is discussed below.

FIG. 2A shows a diagram 200 illustrating a pose constraint. The pose constraint uses a pose model. To illustrate an example pose model, diagram 200 shows a set of pose subspaces 202. While diagram 200 illustrates the pose model as a set of pose subspaces, other pose models may be used as are known to those of skill in the art.

Set of pose subspaces 202 can be estimated from a dataset of object images with different appearances. While set of pose subspaces 202 was estimated from a data set of face images, those of skill in the art would recognize that different objects can be used to create the pose subspaces. The different objects would be categorized by appearances. In an embodiment with faces, set of pose subspaces 202 is estimated with faces categorized by different poses.

In examples, the dataset of face images may be extracted the Honda/UCSD, available from University of California, San Diego, or YouTube™ video database. The dataset may include a large number of face images of different poses with a variety of different faces and varying illumination conditions. For example, the dataset may include approximately 8,000 face images of different poses with 14 different faces and varying illumination conditions. The dataset may be categorized into multiple pose clusters. In an embodiment, the dataset is categorized into five pose clusters—right profile, right 45 degrees, front, left 45 degrees, and left profile. Each pose cluster is used to train a pose subspace.

In an example, each pose cluster is used to train a principal component analysis (PCA) subspace. PCA mathematically transforms data to a new coordinate system. Thus, for each category a new coordinate system (subspace) is created. In the case of faces, for each pose (e.g., frontal, left/right 45-degree, and left/right profile) a new coordinate system is created. When an image, such as an image 204, is transformed into a pose subspace, a location for the image is determined. This location is then used to reconstruct the face (with some error) the original image space. A smaller reconstruction error indicates a higher likelihood that a pose of a face in the image matches the category of the pose subspace, e.g. front, left/right 45-degree, and left/right profile. The pose subspace having an origin with the smallest error corresponds to a pose prediction of an image. For example, when image 204 is applied to each of the pose subspaces, the pose subspace for the right 45 degree pose may have the smallest error value. So, the pose prediction for image 204 is the right 45 degree pose.

Diagram 200 illustrates a set of pose subspaces at table 206. Table 206 is organized such that each row illustrates a pose subspace. In each row, the leftmost image is a mean of the pose subspace, and the other images are principal bases. Each principal basis has an eigenvalue (λ) associated with it. More detail on the pose constraint and how it may be used in practice is described below.

FIG. 2B shows a diagram 250 illustrating an alignment constraint. An alignment constraint determines whether or not a candidate image contains a well-cropped object. To determine how well an image is cropped, an alignment constraint may use a classifier that discriminates well-cropped object images from the drifted object images or, possibly, images without objects. When an image is applied to the classifier, the classifier results in an alignment confidence score. The alignment confidence score indicates how well cropped the image is.

Diagram 250 illustrates one such classifier function $f_s(I_t)$. The classifier in diagram 250 is trained to discriminate well-cropped faces. However, the classifier may be trained to discriminate other objects as well. The same face dataset used to create the pose subspaces may be used to train the classifier. In one embodiment, the classifier may be a support vector machine (SVM) classifier. In other embodiments, the classifier may be AdaBoost or other classifiers known to those of skill in the art. To train the classifier, well-cropped images and poorly-cropped images may be used. The well-cropped images may be determined, for example, by enabling a user to define the good crops. The poorly-cropped images may be determined by shifting, rotating, and scaling the good crops randomly by a significant amount. Examples of bad crops are shown in set 252 and examples of good crops are shown in set 254. More detail on the alignment constraint and how it may be used in practice is described below.

FIG. 3 is an architecture diagram illustrating a system 300 for face tracking and recognition according to an embodiment. System 300 includes an object tracker 310 and an optional object recognizer 330.

Object tracker 310 receives a sequence of frames 302 of a video and determines a likely position of an object, such as a face, in each frame. Once the object is tracked, object tracker 310 may send resulting object positions 320 to an optional object recognizer 330. Object tracker 310 includes a tracker 312 and a visual constrainer 314. Tracker 312 coordinates with visual constrainer 314 to track the video. To track the video, tracker 312 may determine an emission probability and a transition probability.

Tracker 312 may determine the emission probability based on an energy value determined by visual constrainer 314. The emission probability is a probability of an observed state given a present state. More specifically, the emission probability is a probability of receiving the frame $F_t$ (the observed state) given a tracking state $u_t$ (the present state).

Tracker 312 also may determine a transition probability. The transition probability is the probability of a present state given a previous state. More specifically, the transition probability is a probability of a tracking state $u_t$ (the present state) given a tracking state $u_{t-1}$ (a previous state). The tracking state $u_{t-1}$ defines a portion of a previous frame $F_{t-1}$ that likely includes the object.

Based on the emission probability and the transition probability, tracker 312 may determine a tracking probability. The tracking probability is a probability of the portion of the frame $F_t$ defined by the tracking state $u_t$ given a sequence of previous frames in the sequence of frames. Finally, tracker 312 determines a resultant tracking state based on the tracking probability. The resultant tracking state defines a portion of the frame $F_t$ likely including the object. The resultant tracking state is sent to object recognizer 330 in object positions 320.

As mentioned earlier, visual constrainer 314 determines an energy value based on a visual constraint. In an embodiment, visual constrainer 314 determines an energy value based on generic constraints. A pose constraint is implemented by a pose constraint module 316. Another constraint may reject poorly aligned tracking states, as implemented by an alignment constraint module 318. A third constraint incrementally adapts to the appearance of the object being tracked. The third constraint is implemented in an adaptive module 322. By applying these three constraints, visual constrainer 314 determines an energy value. As described above, tracker 312 uses the energy value to determine the object positions and track the object. By combining constraints, visual constrainer 314 provides for more robust and accurate object tracking. More detail regarding the operation of object tracker 310 is provided below.

As discussed earlier, object tracker 310 may be used to track faces. Once object tracker 310 determines the positions of the faces in the video frames, object recognizer 330 optionally may identify the faces. Any type of face recognition algorithm may be used, including those with a hidden Markov model. An example face recognition algorithm is described below.

System 300 may be implemented on any computing device. Example computing devices, include, but are not limited to, a computer, workstation, distributed computing system, embedded system, stand-alone electronic device, networked device, mobile device, rack server, television, set-top box, or other type of computer system. System 300 may include a main memory, preferably random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. The removable storage unit represents a floppy disk, magnetic tape, optical disk, etc. which is read by and written to by the removable storage drive. As will be appreciated, the main memory and the secondary memory may include a computer usable storage medium having stored therein computer software and/or data.

Each of object tracker 310, tracker 312, visual constrainer 314, pose constraint 316, alignment constraint 318, adaptive module 322, and object recognizer 330 may be implemented in hardware (such as a processor), software, firmware or any combination thereof.

Figure 4:
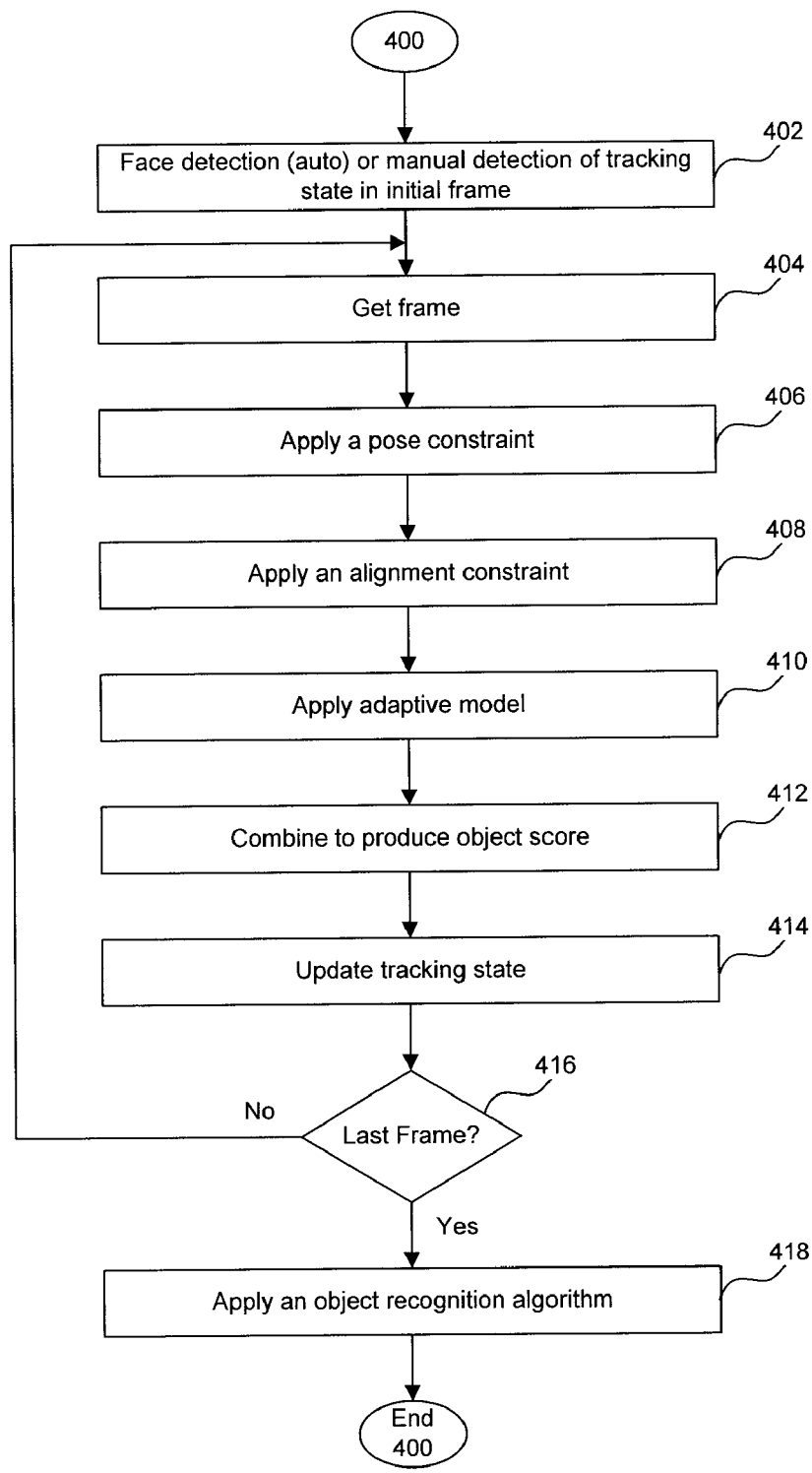
FIG. 4 is an flowchart illustrating an exemplary method for object tracking and recognition, which may be used in operation of the system in FIG. 3.

FIG. 4 is an flowchart illustrating a method 400 for object tracking and recognition, which may be used in operation of system 300 in FIG. 3. In an example, steps 402 through 414 may be used in operation of object tracker 310 and step 416 may be used in operation of object recognizer 330.

Method 400 starts by detecting an object, such as a face, in an initial frame at step 402. As described with respect to FIG. 1, the face detection in the initial frame $F_0$ may be done automatically or manually. Automatic detection may be done, for example, with an object detector, such as a face detector. At step 404, a next frame $F_t$ in the video is processed.

Visual constraints are applied to each frame $F_t$. In step 406, a pose constraint is applied to frame $F_t$ defined by a tracking state $u_t$. To apply the pose constraint, a cropped object image $I_t$ may be determined based on the portion of frame $F_t$ defined by tracking state $u_t$. Cropped object image $I_t$ may be determined by applying a warping function, such as $I_t = \omega(u_t, F_t)$, that normalizes the orientation and scale of the tracking state. The warping function is described above with respect to FIG. 1.

Once cropped object image $I_t$ is determined, a pose constraint is applied to cropped object image $I_t$ to determine a pose constraint value. The pose constraint includes a set of pose subspaces as described above with respect to FIG. 2. As described above, each of the pose subspaces may be a PCA subspace created with images of a particular pose, e.g. right profile, right 45 degrees, front, left 45 degrees, and left profile. When cropped object image $I_t$ is applied to the PCA subspace, a distance value is determined. When cropped object image $I_t$ is applied to each PCA subspace, a set of distances is determined. The minimum distance in the set of distances is selected as the pose constraint value. This is described with the following equation:

$$d(I_t, M_p) = \min_i d(I_t, (u_i, B_i)), \quad (2)$$

where $d(I_t, M_p)$ is the pose constraint value and $(u_i, B_i)$ represents a PCA subspace i.

Applying another visual constraint, at step 408 an alignment constraint is applied. The alignment constraint determines whether cropped object image $I_t$ contains a well-aligned and well-cropped object. As discussed earlier with respect to FIG. 2, the alignment constraint may include a classifier, such as an SVM classifier, trained to distinguish good and bad crops. The classifier returns an alignment confidence value, denoted as $f_s(I_t)$. A high confidence value indicates a better alignment and crop of cropped image $I_t$.

At step 410, an adaptive model is applied. As described with respect to FIG. 1, the adaptive term constraint learns an appearance of the object based on the sequence of past images $T_0$ through $I_{t-1}$. One example adaptive term constraint is described in Ross et al., "Incremental Learning for Robust Visual Tracking," *IJCV*, 2007. The adaptive term constraint may be a PCA subspace created from the sequence of past images. The PCA subspace may be represented by $M_a(I_0 \ldots I_{t-1})$. To apply the adaptive term, a distance is determined between the cropped image $I_0$ and an origin of a PCA subspace $M_a(I_0 \ldots I_{t-1})$. The distance is represented as $d(I_t, M_a(I_0 \ldots I_{t-1}))$ and may be referred to an adaptive term value.

At step 412, the adaptive term value, pose constraint value, and the alignment confidence value are combined to produce an object score, such as an energy value. The energy value may be a weighted combination of the pose constraint value, the confidence value from the alignment constraint and the distance from the adaptive term. The energy value may be determined by the following equation:

$$E(I_t) = \lambda_a d(I_t, M_a(I_0 \ldots I_{t-1})) + \lambda_p d(I_t, M_p) - \lambda_s f_s(I_t), \quad (3)$$

where $\lambda_a$, $\lambda_p$ and $\lambda_s$ are contribution factors that are greater than zero. Variable $\lambda_a$ is a contribution factor for the adaptive term, $\lambda_p$ is a contribution factor for the pose classifier and $\lambda_s$ is a contribution factor for the classifier. In other embodiments, insubstantial changes may be made to energy function (3). The insubstantial changes may include adding small offsets, coefficients, and exponents. The combination also may be done a completely different mechanism such as a classifier or machine learning algorithm.

Once the energy value is determined, a resultant tracking state is determined at step 414. To determine the resultant tracking state, an emission probability may be determined. The emission probability is a probability of receiving the frame $F_t$ given the tracking state $u_t$. As discussed above, the tracking state $u_t$ is used to determine $I_t$ using warping function $\omega(u_t, F_t)$. In one embodiment, the emission probability is a Gibbs energy with a scale $\sigma$. In that embodiment, the emission probability may defined by the equation:

$$P(F_t|u_t) \propto e^{-E(I_t)/\sigma^2}. \quad (4)$$

In addition to an emission probability, a transition probability may also be determined. The transition probability is a probability of the portion of the frame $F_t$ defined by the tracking state $u_t$ including the object given a tracking state $u_{t-1}$. Tracking state $u_{t-1}$ defines a portion of a previous frame $F_{t-1}$ that likely includes the object. Various models of the transition probability may be used. In one embodiment, the transition probability is modeled with simple Gaussian smoothness. In that embodiment, the transition probability may be defined by the equation:

$$P(u_t|u_t-1) = N(u_t; u_t-1, \Sigma). \quad (5)$$

With the emission and transition probabilities, a tracking probability $P(u_t|F_0 \ldots t)$ may be determined using Bayesian recursion. An example equation employing Bayesian recursion is:

$$P(u_t|F_0 \ldots t) \propto \int P(u_t|u_{t-1}) \cdot P(u_{t-1}|F_0 \ldots t-1) du_{t-1} \times P(F_t|u_t). \quad (6)$$

The equation (6) may be integrated using sampling-based particle filtering. To integrate using sampling-based particle filtering, a set of weighted particles is maintained to approximate $P(u_{t-1}|F_0 \ldots t-1)$.

Once the tracking probability is determined the resultant tracking state may be determined. The resultant tracking state defines the position of the object in the video. The resultant tracking state may be determined by determining the tracking state $u_t$ with the highest probability $P(u_t|F_0 \ldots t)$. Alternatively, the resultant tracking state may be determined gradient descent, mean-shift or other ways known to those of skill in the art.

Steps 404 through 414 may be repeated to determine a resultant tracking state (defining a position of the object) for each frame in the video as shown at step 416. The object tracked in steps 404 through 416 may be a face. At step 418, an object recognition algorithm, such as a face recognition algorithm, may be applied to each frame in the video. A face recognition algorithm determines an identity of a face. Any face recognition algorithm can be used as is known to those of skill in the art. An example face recognition method is described below with respect to FIGS. 6A-B. These steps can also be repeated if more than one object is being tracked simultaneously.

Figure 5:
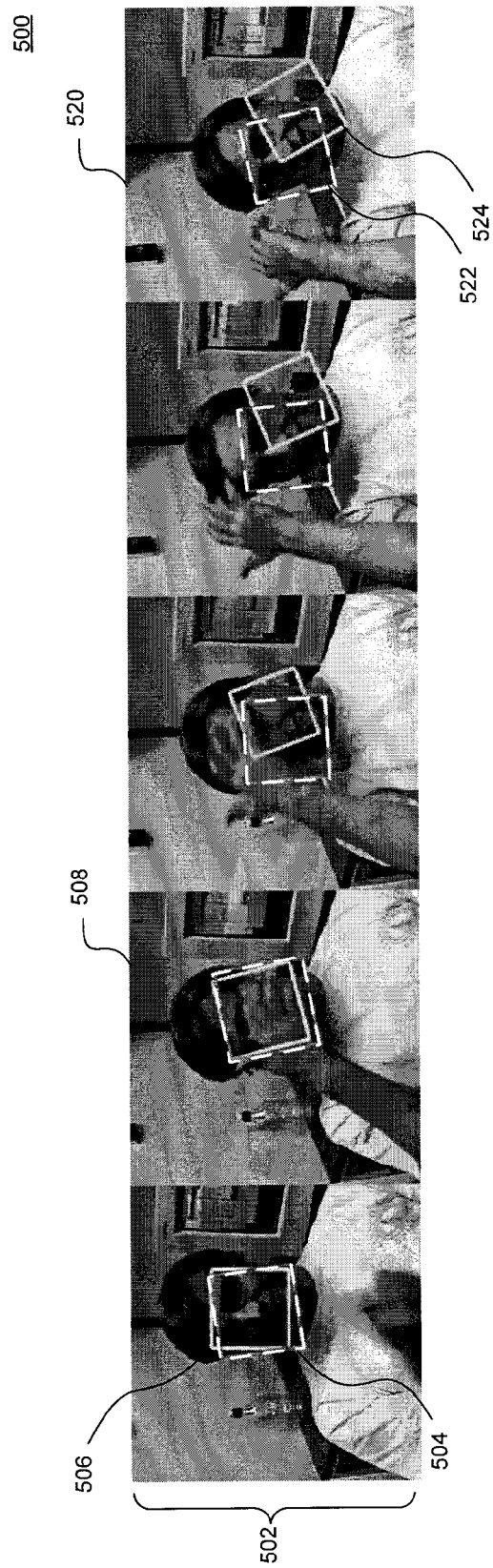
FIG. 5 is a diagram illustrating an exemplary operation of the system in FIG. 3 when a face is occluded.

FIG. 5 shows a diagram 500 illustrating an example operation of face tracking when a face is occluded. Diagram 500 shows a sequence of frames 502 of a video of a face. Sequence of frames 502 have been subjected to two face tracking algorithms—with and without visual constraints. Each frame in sequence of frames 502 has a tracking state determined using both face tracking algorithms. Tracking states represented by boxes with solid lines, such as tracking state 506, may be determined using a face tracking algorithm without visual constraints. Tracking states represented by boxes with dashed lines, such as tracking state 504, may be determined using a face tracking algorithm with visual constraints.

In frame 508, the face in the video is occluded. The tracking states determined without visual constraints drift away from the face, whereas the tracking states determined with visual constraints stay closely cropped to the face. This is seen in a last frame 520. In frame 520, a tracking state 524 determined without visual constraints has drifted away from the face. On the other hand, a tracking state 522 determined with visual constraints remains closely cropped to the face. While diagram 500 illustrates face tracking, the tracking state may stay closely cropped regardless of the object tracked. Thus, diagram 500 clearly illustrates a key advantage of tracking using visual constraints according to an embodiment of the present invention.

Once a face has been tracked, the identity of the face may be determined using a object recognition algorithm. FIGS. 6A-B show diagrams illustrating an example object recognition algorithm using a hidden Markov model, which may be used by the system in FIG. 3.

FIG. 6A illustrates a diagram 600 illustrating a hidden Markov model (HMM) that may be used in the object recognition algorithm. For clarity, the algorithm illustrated in diagram 600 is configured to recognize faces. However, those of skill in the art would recognize that the algorithm may be used to recognize other objects as well. In diagram 600, the hidden states of the HMM are represented as $s_1$ through $s_T$. Hidden states $s_1$ through $s_T$ may be modeled as different facial poses. The observed states of the HMM are represented as $x_1$ through $x_T$. Each observed state $x_t$ may be a feature vector extracted from the warped image $I_t$ of the face by a feature extractor. The subject (class) variable y is one of M possible identities of the face.

As mentioned earlier, observed states $x_1$ through $x_t$ are extracted using a feature extractor. While any feature extractor may be used, one example feature extractor is linear discriminant analysis (LDA). In an example, the LDA algorithm may be trained with generic (not person-specific) face images from a video data set, such as subset of the Honda/UCSD face database. The generic face images are then hand-labeled in a number of different poses (e.g., up, down, left and right profiles, left and right 45 degree angles and front). Once trained, an LDA features algorithm can create six dimensional feature vectors based on the face images. In another example, landmark-based features may be used as the feature extractor.

For a particular subject, the HMM has an emission probability that defines the probability of observing a particular set of features given a particular face pose. For a particular face pose j, the subject-specific emission probability may be modeled as a Gaussian distribution. The Gaussian distribution may be defined by the equation:

$$P_y(x_t|s_t=j)=N(x_t;m_j^y,V_j^y), \quad (7)$$

where $m_j^y$ and $V_j^y$ are the mean and covariance respectively of the features of subject y in pose j. Applying the emission probability to the HMM for a particular subject y, the HMM follows the equation:

$$P_y(s, x) = P(s_1) \cdot \prod_{t=2}^{T} P(s_t \mid s_t - 1) \cdot \prod_{t=1}^{T} P_y(x_t \mid s_t), \quad (8)$$

Ultimately, the face recognition algorithm is trying to determine subject y. In an embodiment, to determine subject y, two approaches may be used: class prediction and class estimation. Class prediction applies the equation:

$$y^* = \underset{y}{\mathrm{argmax}}\, P(y \mid x_{1,...,T}),\ = \underset{y}{\mathrm{argmax}}\, P(y)Py(x_{1,...,T}). \quad (9)$$

The class estimation, on the other hand, can be done recursively:

$$P(y \mid x_{1,...,t+1}) \propto \quad (10)$$
$$P(y \mid x_{1,...,t}) \cdot \sum_{s_t,s_{t+1}} P_y(x_{t+1} \mid s_{t+1}) P(s_{t+1}) P_y(s_t \mid x_{1,...,t})$$

This face recognition algorithm is merely exemplary and other algorithms may be used as is known to those of skill in the art.

FIG. 6B shows a diagram 650 illustrating an example operation of the face recognition algorithm described with respect to FIG. 6A. A top row 660 shows an example face sequence of a subject Danny. A second row 670 includes probability histograms illustrating the pose prediction, $P(s_t|x_{1,\ldots,t})$, for each cropped face image in the face sequence. For example, a histogram 672 shows that a cropped face image 662 has a highest probability of being oriented in a front pose. On the other hand, a histogram 674 shows that a right 45 degree pose has the highest probability for a cropped face image 664. Histogram 674 also shows that there is a smaller probability of cropped face image 664 having a right profile. In sum, row 670 shows how the pose is predicted correctly as the face images in row 660 changes from a frontal to a right profile.

Rows 680 and 690 illustrate how the face recognition algorithm detects the subject Danny as more frames are incorporated into the HMM. Initially the face recognition algorithm incorrectly identified the subject as Ming as illustrated in a chart 682. However, as more frames are incorporated, a probability of the subject being Danny rises well above a probability of the subject being Ming. Thus, the face recognition algorithm correctly identifies the subject as Danny.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for tracking an object in a frame of a video, comprising:
   (a) determining an adaptive term value based on an adaptive model and at least a portion of the frame, wherein the adaptive model is determined based on at least one previous frame of the video;
   (b) determining a pose constraint value based on a pose model and at least a portion the frame, wherein the pose model is determined based on different possible appearances of the object;
   (c) determining an alignment confidence score based on an alignment model and at least a portion the frame, wherein the alignment model detects misalignments of the tracked object;
   (d) determining an energy value based on the adaptive term value, the pose constraint value, and the alignment confidence score; and (e) determining a resultant tracking state based on the energy value, the resultant tracking state defining a likely position of the object in the frame given the object's likely position in a set of previous frames in the video.

2. The computer-implemented method of claim 1, further comprising:
   (f) determining a cropped object image $I_t$ based on at least a portion of the frame, the portion defined by a tracking state $u_t$,
   wherein the determining (b) comprises applying the pose model to the cropped object image $I_t$ to determine the pose constraint value.

3. The computer-implemented method of claim 2, wherein the determining (c) comprises applying the alignment model to the cropped object image $I_t$ to determine the alignment constraint value.

4. The computer-implemented method of claim 3, further comprising:
   (g) constructing a set of pose subspaces,
   wherein the determining (b) further comprises determining the pose constraint value, wherein the pose constraint value is a minimum pose distance between the cropped object image $I_t$ and each pose subspace in the set of pose subspaces.

5. The computer-implemented method of claim 3, further comprising:
   (g) training a classifier function,
   wherein the determining (c) further comprises applying the classifier function to the cropped object image $I_t$ to determine the alignment confidence score.

6. The computer-implemented method of claim 3, wherein the determining (d) comprises determining the energy value, wherein the energy value satisfies an equation:

$$E(I_t)=\lambda_a d(I_t,M_a(I_{0\ldots t-1}))+\lambda_p d(I_t,M_P)-\lambda_s f_s(I_t),$$

wherein $E(I_t)$ is the energy value,
   wherein $d(I_t, M_P)$ is the pose constraint value,
   wherein $f_s(I_t)$ is the alignment confidence score,
   wherein $d(I_t, M_a(I_{0\ldots t-1}))$ is the adaptive term value, and
   wherein $\lambda_a$, $\lambda_p$ and $\lambda_s$ are contribution factors that are greater than zero.

7. The computer-implemented method of claim 3, further comprising:
   (g) determining an emission probability based on the energy value;
   (h) determining a transition probability; and
   (i) determining a tracking probability based on the emission probability and the transition probability,
   wherein the determining (e) comprises determining the resultant tracking state based on the tracking probability.

8. The computer-implemented method of claim 7, wherein the determining (g) comprises determining the emission probability, wherein the emission probability is a probability of receiving the frame given the tracking state $u_t$,
   wherein the determining (h) comprises determining the transition probability, wherein the transition probability is a probability of the portion of the frame defined by the tracking state $u_t$ including the object given a tracking state $u_{t-1}$, wherein the tracking state $u_{t-1}$ defines a portion of a previous frame $F_{t-1}$ that likely includes the object, and
   wherein the determining (i) comprises determining the tracking probability, wherein the tracking probability is a probability of the portion of the frame defined by the tracking state $u_t$ including the object given a sequence of previous frames in the sequence of frames.

9. The computer-implemented method of claim 7, wherein the determining (g) comprises determining the emission probability using a Gibbs energy function.

10. The computer-implemented method of claim 1, wherein the determining (e) comprises determining the resultant tracking state, the resultant tracking state defining a likely position of a face in the frame.

11. The computer-implemented method of claim 10, further comprising:
    (f) applying a face recognition algorithm to the portion of the frame defined by the resultant tracking state to determine an identity of the face.

12. The computer-implemented method of claim 11, wherein the applying (f) comprises modeling a facial pose as a hidden state in a hidden Markov model.

13. A system for tracking an object in a frame of a video, comprising:
    a pose constraint module that determines a pose constraint value based on a pose model and at least a portion the frame;
    an alignment constraint module that determines an alignment confidence score based on an alignment model and at least a portion the frame;
    an adaptive module that determines an adaptive term value based on an adaptive model and at least a portion of a frame in the video;
    a visual constrainer that determines an energy value based on the adaptive term value, the pose constraint value, and the alignment confidence score; and
    a tracker that determines a resultant tracking state based on the energy value, the resultant tracking state defining a likely position of the object in the frame given the object's likely position in a set of previous frames in the video,
    wherein the adaptive model is determined based on at least one previous frame of the video,
    wherein the pose model is determined based on different possible appearances of the object, and
    wherein the alignment model detects misalignments of the tracked object.

14. The system of claim 13, wherein the visual constrainer determines a cropped face image $I_t$ according to the portion of the frame defined by the tracking state $u_t$, and
    wherein the pose constraint module applies a pose constraint to the cropped face image $I_t$ to determine the pose constraint value.

15. The system of claim 14, wherein the alignment constraint module applies an alignment constraint to the cropped face image $I_t$ to determine the alignment confidence score.

16. The system of claim 15, wherein the visual constrainer constructs a set of pose subspaces, and wherein the pose constraint value is a minimum pose distance between the cropped face image $I_t$ and each pose in the set of pose subspaces.

17. The system of claim 16, wherein the visual constrainer trains a classifier function, and
    wherein the alignment constraint module applies the classifier function to the cropped face image $I_t$ to determine an alignment confidence score.

18. The system of claim 15, wherein the visual constrainer determines the energy value, wherein the energy value satisfies an equation:

$$E(I_t)=\lambda_a d(I_t,M_a(I_{0\ldots t-1}))+\lambda_p d(I_t,M_P)-\lambda_s f_s(I_t),$$

wherein $E(I_t)$ is the energy value,
    wherein $d(I_t, M_P)$ is the pose constraint value,
    wherein $f_s(I_t)$ is the alignment confidence score, wherein d($I_t$, $M_a(I_{0 \ldots t-1})$) is the adaptive term value, and wherein $\lambda_a$, $\lambda_p$ and $\lambda_s$ are contribution factors that are greater than zero.

19. The system of claim 15, wherein the tracker determines an emission probability based on the energy value, determines a transition probability, determines a tracking probability based on the emission probability and the transition probability and determines the resultant tracking state based on the tracking probability.

20. The system of claim 19, wherein the emission probability is a probability of receiving the frame given the tracking state $u_t$,
    wherein the transition probability is a probability of the portion of the frame defined by the tracking state $u_t$ including the object given a tracking state $u_{t-1}$, wherein the tracking state $u_{t-1}$ defines a portion of a previous frame $F_{t-1}$ that likely includes the face, and
    wherein the tracking probability is a probability of the portion of the frame defined by the tracking state $u_t$ including the object given a sequence of previous frames in the sequence of frames.

21. The system of claim 13, wherein the tracker determines the emission probability using a Gibbs energy function.

22. The system of claim 13, wherein the object is a face.

23. The system of claim 22, further comprising:
    a object recognizer that applies a face recognition algorithm to the portion of the frame defined by the resultant tracking state to determine an identity of the face.

24. The system of claim 23, wherein the object recognizer models a facial pose as a hidden state in a hidden Markov model.

* * * * *

UNITED STATES PATENT AND TRADEMARK OFFICE
CERTIFICATE OF CORRECTION

| | |
|---|---|
| PATENT NO. | : 8,085,982 B1 |
| APPLICATION NO. | : 12/143590 |
| DATED | : December 27, 2011 |
| INVENTOR(S) | : Minyoung Kim |

Page 1 of 1

It is certified that error appears in the above-identified patent and that said Letters Patent is hereby corrected as shown below:

Column 11, row 8, please change "image L" to --image $I_t$--.

Signed and Sealed this
Seventeenth Day of April, 2012

David J. Kappos
*Director of the United States Patent and Trademark Office*